United States Patent [19]

Banas

[11] 4,002,877
[45] Jan. 11, 1977

[54] METHOD OF CUTTING WITH LASER RADIATION AND LIQUID COOLANT

[75] Inventor: Conrad M. Banas, Manchester, Conn.

[73] Assignee: United Technologies Corporation, Hartford, Conn.

[22] Filed: Dec. 13, 1974

[21] Appl. No.: 532,566

[52] U.S. Cl. .................................. 219/121 LM
[51] Int. Cl.² ........................................ B23K 15/00
[58] Field of Search ... 219/121 L, 121 LM, 121 EB, 219/121 EM; 331/DIG. 1

[56] References Cited
UNITED STATES PATENTS 3,931,491   1/1976   Stumpf .................... 219/121 L Primary Examiner—Arthur T. Grimley
Assistant Examiner—G. R. Peterson
Attorney, Agent, or Firm—Anthony J. Criso

[57] ABSTRACT

A method of cutting a multilayer pile of sheet material with a beam of laser radiation is disclosed. A laser beam having a low order mode intensity distribution is focused onto the pile and during cutting a stream of liquid coolant is directed into the material vaporization region to absorb energy from the outer region of the mode distribution which could otherwise result in adhesion of adjacent layers, globularization, singeing or other undesired effect.

5 Claims, 5 Drawing Figures

METHOD OF CUTTING WITH LASER RADIATION AND LIQUID COOLANT

BACKGROUND OF THE INVENTION

1. Field of Invention

The present invention relates to cutting with radiation and more particularly to cutting multilayered sheet material with a beam of laser radiation.

2. Description of the Prior Art

Over the years various devices using energetic beams for cutting and welding have been discussed in the technical literature and the patent art. Some of the early work involved cutting metals with electron beams and laser radiation. Such systems were found useful in particular applications although they have not been universally adopted because of various shortcomings. One of the improvements to cutting with beams of energy was the application of an assist gas jet to the cut zone to aid the cutting process. The jet tends to blow molten material away from the cut zone and, if a reactive gas is used the cutting procedure can be enhanced by chemical reaction between the gas and the workpiece. Such techniques are typified by the teachings in U.S. Pat. No. 3,569,660 entitled Laser Cutting Apparatus issued Mar. 9, 1971 to P. T. Houldcroft and U.S. Pat. No. 3,597,578 entitled Thermal Cutting Apparatus And Method issued on Aug. 3, 1971 to A. B. Sullivan et al. The cutting art developed and became more sophisticated allowing beams of radiation to be used for various forms of materials processing. One of the persistent shortcomings which workers in the field encounter is the inability to produce a uniformly smooth clean cut due to excessive or improperly distributed energy during the materials processing. Deleterious effects such as scorching, sticking and globularizing along a cut pattern have been minimized and in some cases eliminated by the application of a coolant, usually in the form of a gas, or mist or some combination thereof. A typical teaching in this regard is provided in U.S. Pat. No. 3,629,546 entitled Air-Cool Laser Processing Of Materials issued to F. H. Fry on Dec. 21, 1971. Additional material which is representative of the state of the art as typified in Fry is disclosed in The $CO_2$ Laser And Its High Power Applications by M. Hillier, Design Engineering, May 1969, page 47 and Laser Welding And Cutting by M. M. Schwartz, Welding Research Council Bulletin 167, November 1971. An outgrowth of these disclosures occurs in U.S. Pat. No. 3,679,863 entitled Thermal Cutting Apparatus issued to P. T. Houldcroft on July 25, 1972. The patent teaches the cutting of materials such as paper and fabric with a laser beam utilizing a jet of gas which is inert with respect to the process to carry an atomized stream of liquid coolant into the region of the cutting activity at the workpiece to reduce the charring which is otherwise observed. Although several patents and technical publications describe the use of laser radiation to cut various materials including metal, plastic, wood, composites, fiber and synthetic material, no one has reported successful cutting of a layered stack of sheet material having a low melting temperature without incurring various degrees of sticking together of the adjacent layers of the material being cut.

SUMMARY OF THE INVENTION

A primary object of the present invention is to cut a multilayer stack of synthetic sheets with a beam of laser radiation without incurring interlayer adhesion or globularization of the synthetic material along the cut edges.

The present invention is predicated on the recognition that in order to accomplish a clean sharp cut through a multilayered pile of material in sheet form with laser radiation, the cross sectional energy intensity profile of the laser beam is ideally uniform. In theory, such a beam can provide a sufficient amount of energy to completely vaporize the material in the path of the beam and not affect the material immediately adjacent to the cut. In practice, the laser beam having the highest quality profile which can be produced is Gaussian, that is the intensity decreases exponentially with distance from the center to the edge although some energy exists at the edge. When such a beam is used to cut, the center intensity is made sufficiently high to vaporize the material of concern, however, the intensity at the edge of the beam is often too low to cause vaporization but sufficiently high to cause melting of the material. By the suitable application of a solid stream of liquid coolant such as water, the energy in the edge of the cutting beam which is sufficiently intense to otherwise cause melting but not sufficiently intense to cause vaporization of the material being cut is absorbed by the heating and phase change of the coolant.

According to the present invention a multilayer stack of material is cleanly cut with a beam of laser radiation in combination with a solid stream of a liquid which is directed into the cutting region during the cutting operation.

A feature of the present invention is the injection of a solid stream of liquid coolant directly into the region while the laser energy is interacting with the workpiece. The diameter of the stream of cooling water is approximately the same as the diameter of the laser cutting beam. Another feature of the present invention is the energy profile of the cutting laser radiation which must approximate a Gaussian distribution.

One of the advantages of the present invention is a pile containing a plurality of layers of synthetic sheet material can be cut in a single pass by a beam of laser energy. Since current limits on cutting speed are set by the operating capacity of pattern following equipment, substantially higher effective cutting speeds can be attained. In addition, the material receives a sharp clean cut which avoids adhering of adjacent layers and the formation of globules along the cut edges. The present invention employs a readily available coolant which is low cost and in the majority of applications has no lasting effect on the workpiece.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
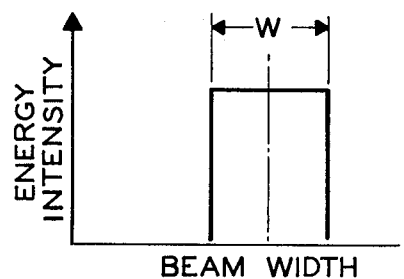
FIG. 1 is a diagram showing the ideal intensity distribution for a cutter beam of laser radiation in accordance with the present invention.
Figure 2:
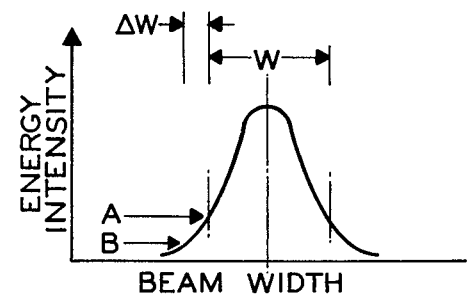
FIG. 2 is a diagram showing the intensity distribution of a laser beam having Gaussian characteristics.

The ideal energy distribution across a laser beam which is to be used to cut through sheet material of natural fibers, synthetic and other materials, particularly in multilayer stacks is a distribution in which the intensity of the radiation is sufficient to cause vaporization of the material across the entire width of the cut and insufficient to induce charring, melting, discoloration or other deleterious effects to the material immediately adjacent to the cut line. An energy intensity having this distribution is shown in FIG. 1 for a cut width W. As a practical matter, the best focused intensity distribution that can be provided with a stable laser resonator operating in its fundamental mode has a Gaussian profile such as is shown in FIG. 2. Presuming for the purposes of this discussion that the minimum energy required to vaporize the material being cut is of intensity A as is shown in FIG. 2, and any energy greater than intensity B is insufficient to cause a deleterious effect to the material, then a certain amount of energy which is in the outer region of the beam, the amount of energy represented approximately by the area $(A-B)\Delta W$ must be prevented from reaching the cut region or dealt with after arrival in a manner which avoids deleterious edge effects.

Figure 3:
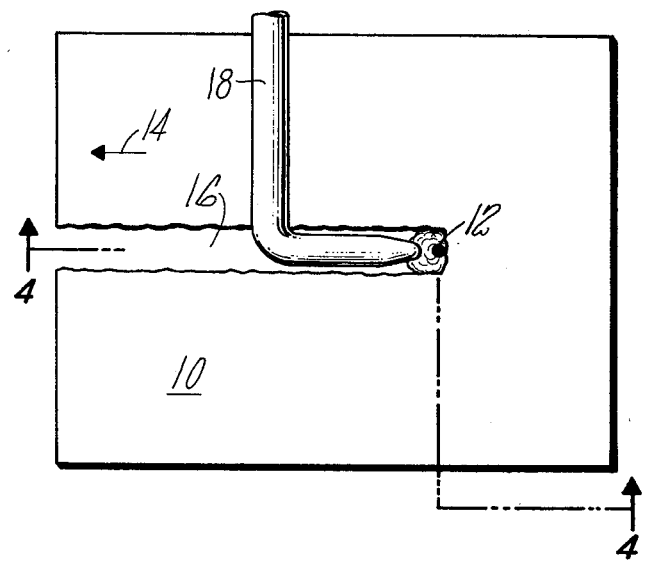
FIG. 3 is a simplified top view of a multilayer stack of sheet material being cut with liquid coolant assist.
Figure 4:
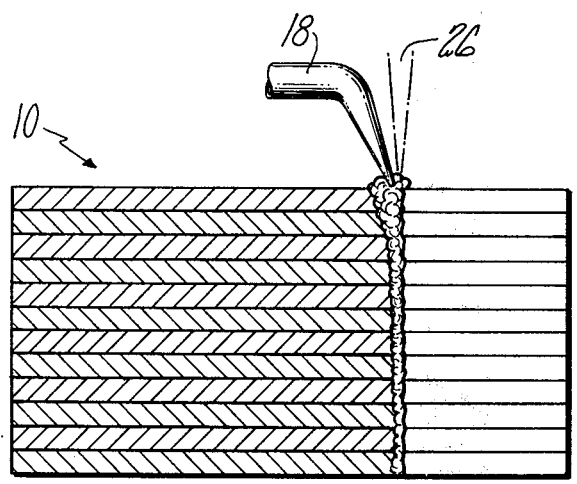
FIG. 4 is a view through the stack in FIG. 3 in the 4—4 direction.

FIG. 3 is a simplified cut view schematic of a multilayer stack 10 of sheet material being cut in accordance with the present invention. A laser, not shown, provides a beam of radiation which is focused to a spot 12. Relative motion in a direction 14 is provided between the stack and the focus spot to produce a cut path 16. A single tube 18 is shown in position to direct coolant onto the stack in the vicinity of the stack beam interaction area. Some of the coolant delivered to the cut is immediately vaporized and some of it gravitates down through the cut path; most of the undesired radiation in the outer region of the beam is absorbed by the coolant. A view through the stack along the line 4—4 illustrates that some vapor generation occurs along the entire height of the stack as is shown in FIG. 4.

Figure 5:
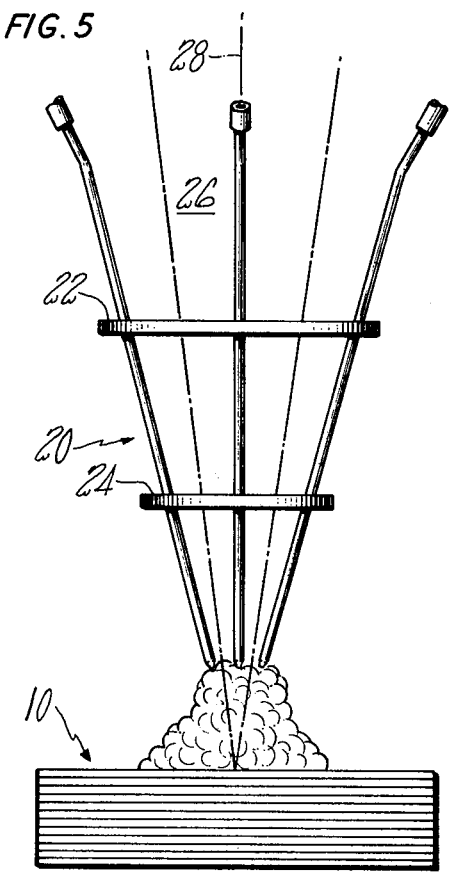
FIG. 5 is a simplified schematic of the overall cut region and apparatus in accordance with the present invention.

An overall system which provides for the absorption of this undesired energy in the outer region of the beam is shown in FIG. 5. A tube holder 20 including an upper ring 22 and a lower ring 24 locate three coolant tubes 18 symmetrically spaced about the rings. A beam 26 of laser radiation is focused to a diameter of approximately one half a millimeter and directed unto the stack of sheet material along an axis of propagation 28. A coolant is pumped through the tubes and intercepts the laser beam in the interaction region between the beam and the sheet material. The coolant becomes heated and undergoes a phase change into a vapor. The energy absorbed by the coolant includes the energy in the outer region of the laser beam which is sufficient to produce a deleterious effect but insufficient to cause vaporization in the cut.

One of the best overall coolants is water since it is inexpensive, readily available, nontoxic, possesses a high heat of vaporization and for the most part does not harm the material being cut. Radiation from a carbon dioxide laser system has been found very useful although the present invention need not be limited to the characteristic wavelengths of carbon dioxide. A significant requirement of the laser beam is that a low order mode of the resonator must be used to produce the beam, preferably the lowest order or fundamental mode. Although water is fairly absorptive of the radiation of the wavelengths produced with a carbon dioxide laser, the coolant can be pumped directly into the focused beam to provide the necessary energy absorption from the outer region of the beam and not interfere significantly with the energy absorption required for cutting by vaporization. Since the interaction between the workpiece in the high intensity central portion of the beam is essentially unaffected, the cutting speed is not diminished by the presence of the liquid coolant. The main effects are a reduction in the width of the cut and improved quality of the cut.

Various experiments have been conducted with an apparatus similar to that shown in FIG. 3 and some of the resulting data are provided in Table 1.

TABLE NO. 1

|  | Polyester | Nylon | Velveteen | Wool | Cotton |
|---|---|---|---|---|---|
| Power (kw) | 2.0 | 2.0 | 2.0 | 1.0 | 2.0 |
| Speed (IPS) | 10 | 10 | 10 | 10 | 40 |
| F Number | 2.5 | 2.5 | 2.5 | 2.5 | 2.5 |
| No. of Layers | 4 | 8 | 6 | 4 | 8 |
| Cut Width (mm) | 3.7 | 3.0 | 2.2 | 3.7 | 1.0 |
| Interlayer Adhesion |  |  |  |  |  |
| Globules | extensive | light | light | none | none |
| Singe | moderate | none | light | none | none |

All of the indicated cuts were performed without the application of a coolant to the focus spot and without exception, the synthetic materials show various degrees of interlayer adhesion, globularizing and singeing. Similar experiments were performed with certain synthetic materials using a water coolant and some of the results are provided in Table 2.

TABLE NO. 2

|  | Polyester | | Nylon | |
|---|---|---|---|---|
|  | $H_2O$ | Dry | $H_2O$ | Dry |
| Powder (kw) | 1.0 | 1.0 | 2.0 | 2.0 |
| Speed (IPS) | 10 | 10 | 11 | 11 |
| F Number | 2.5 | 2.5 | 2.5 | 2.5 |
| No. of Layers | 8 | 8 | 20 | 20 |
| Cut Width (mm) | 0.4 | 2.2 | 0.5 | 2.0 |
| Interlayer Adhesion |  |  |  |  |
| Globules | none | light | none | moderate |
| Singe | none | moderate | none | light |

The improved cut characteristics available with the application of a liquid coolant are readily apparent and the improved cut quality is attained with essentially no reduction in cutting speed. Actually, the effective cutting speed is increased in direct proportion to the number of layers of material in the stack, effective cutting speed being the linear distance cut across a stack of material multiplied by the number of layers in the stack.

Although a single liquid jet directed into the focus spot is the simplest embodiment of the present invention, improved liquid distribution and penetration into the cut zone can be achieved with multiple jets disposed symmetrically about the beam axis as shown in FIG. 5. The multiple jets are arranged to coalesce at the focus spot such that a liquid stream coaxial with the cut path is formed. Obviously, the tube diameter for a multiple jet array should be reduced as the number of tubes increases in order to maintain total flow cross sectional area constant and of the order of the focused spot cross sectional area.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. The method of cutting a multilayer stack of sheet material along a desired pattern including the steps of:
   providing a low mode beam of laser radiation having a symmetric intensity profile across its axis of propagation;
   focusing the beam to a focus point on the multilayer stack to produce an energy intensity distribution with an inner region having an energy intensity sufficient to vaporize the sheet material in its path and an outer region having an energy intensity insufficient to vaporize the sheet material in its path;
   directing a continuous stream of solid liquid coolant onto the stack at the focus point in a direction approximating the direction of propagation of the beam to absorb energy from the outer region of the beam and avoid interlayer fusion to the sheet material along the edges of the cut pattern; and
   causing relative motion between the stack and the focused beam along a path that corresponds to the desired pattern.

2. The method according to claim 1 wherein the coolant is water.

3. The method according to claim 2 wherein the radiation is provided with a carbon dioxide laser.

4. The method according to claim 3 wherein the energy intensity profile of the focused laser radiation is Gaussian or near Gaussian in energy intensity profile.

5. The method according to claim 4 wherein the low order of the beam mode is the $TEM_{oo}$ fundamental mode.

* * * * *

UNITED STATES PATENT OFFICE
CERTIFICATE OF CORRECTION

PATENT NO. : 4,002,877
DATED : January 11, 1977
INVENTOR(S) : CONRAD M. BANAS

It is certified that error appears in the above-identified patent and that said Letters Patent are hereby corrected as shown below:

Column 3, line 24      "insufficient" should read -- sufficient --

Column 4, Table No. 1      Columns 1, 2, 3, 4, 5 corresponding to "Interlayer Adhesion" following words should be inserted respectively -- moderate extensive none none none --

Table No. 2      Columns 1, 2, 3, 4 corresponding to "Interlayer Adhesion" following words should be inserted respectively -- none light none severe --

Signed and Sealed this

Third Day of May 1977

[SEAL]

Attest:

RUTH C. MASON
*Attesting Officer*

C. MARSHALL DANN
*Commissioner of Patents and Trademarks*